UNITED STATES PATENT OFFICE.

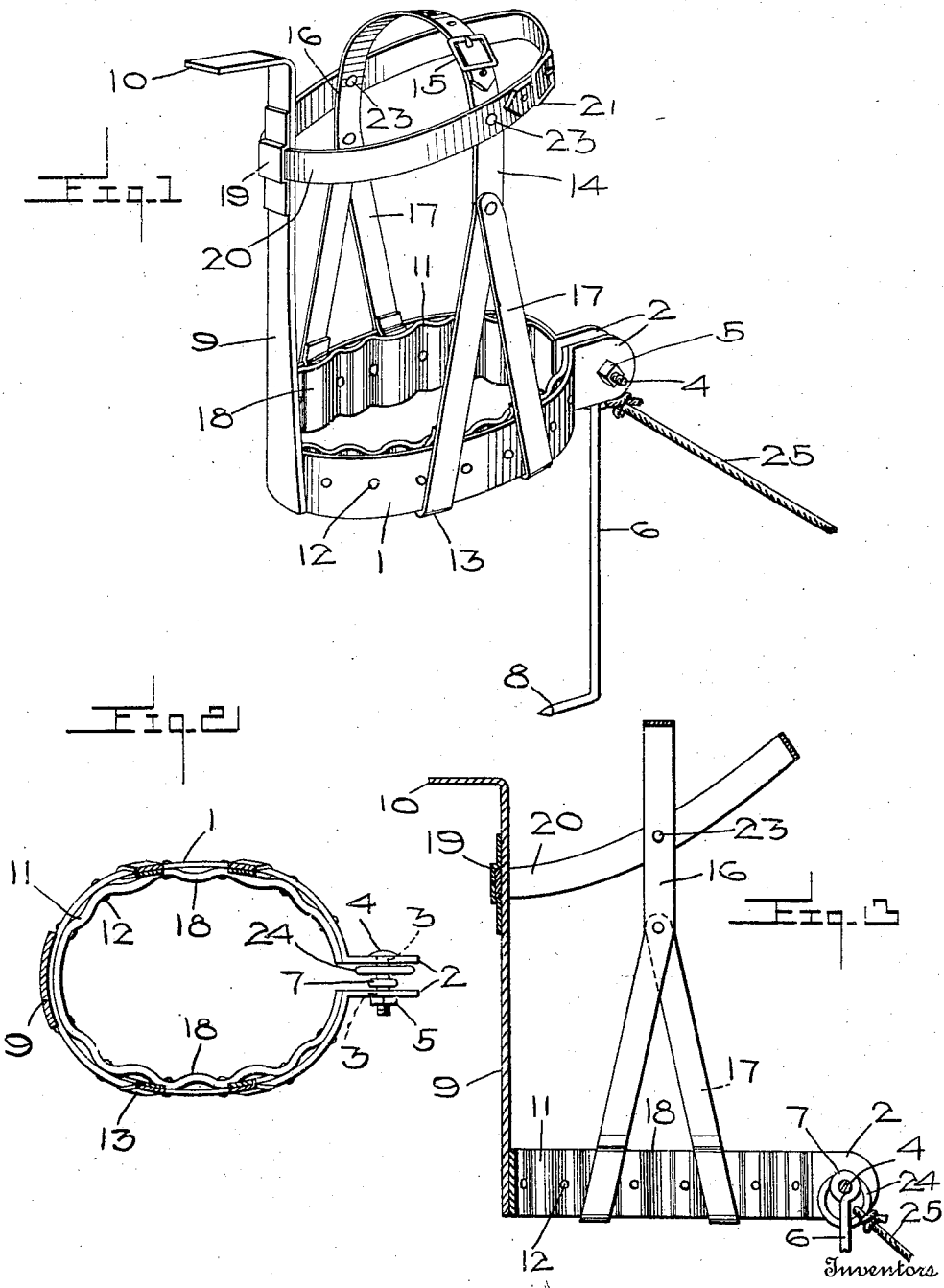

JOSEPH J. STEELE AND DELONA D. OWENS, OF ANSON, TEXAS; SAID OWENS ASSIGNOR TO SAID STEELE.

COMBINED CATTLE-GUARD AND HALTER.

968,279.  Specification of Letters Patent.  Patented Aug. 23, 1910.

Application filed April 28, 1910. Serial No. 558,142.

*To all whom it may concern:*

Be it known that we, J. J. STEELE and D. D. OWENS, citizens of the United States, residing at Anson, in the county of Jones and State of Texas, have invented certain new and useful Improvements in Combined Cattle-Guards and Halters, of which the following is a specification.

This invention relates to a combined cattle guard and halter, and more particularly to a guard for preventing the animal from forcing its way through a fence or other inclosure and partly destroying the same.

The object of the invention is to provide a durable, practical and efficient device of this character whereby the guard forming a part of the halter will not in any way inconvenience the freedom of the animal in grazing, feeding or drinking, and further providing a halter to which a rope may be conveniently attached for leading the animal or tying the same within a barn or other place.

A further object of the invention is to construct a guard in such a manner that the same will automatically remain in its proper and operative position notwithstanding the position of the head of the animal, and in properly strengthening the halter and parts carried thereby throughout their entire construction, and thus rendering the same pliable and self-conforming when applied about the animal's head, the metallic parts of the halter being properly cushioned to protect the metallic connections passing through the several parts.

Other objects and advantages will be apparent from the following description and it will be understood that changes in the specific structure shown and described may be made within the scope of the claims without departing from the spirit of the invention.

In the drawings: Figure 1 is a perspective view of the complete invention, Fig. 2 is a horizontal sectional view of the band and parts accompanying the same for encircling the lower portion of the head of the animal, Fig. 3 is a vertical sectional view of the complete invention.

Referring to the drawings, 1 represents an elliptical shaped metallic band which approximately conforms to the shape of the head of the animal adjacent to its mouth, and is provided with two terminal flat extensions 2 which are normally located parallel to one another but separated from each other, each of said extensions being provided with openings 3 for loosely receiving a bolt 4 upon the screw threaded end of which is adjustably secured a nut 5, for limiting the expansion of the metallic band 1.

Loosely mounted upon the bolt 4 between the extension 3 of the metallic band 1 is a hooked arm 6, the upper end of which is provided with an eye 7 through which the said bolt freely passes, the said arm being thereby suspended by the latter and is caused to always assume a vertical position independently of the position of the head of the animal. The hooked arm 6 is provided with an engaging terminal end 8 which points toward the face of the animal, the said arm being of any suitable length to accomplish the desired result and operative in a manner to be hereinafter described.

Rigidly secured to the forward medial portion of the metallic band 1 and to the outer surface thereof is the lower end of a tapering plate 9, which extends upwardly along the face of the animal to a suitable height and having its terminal end bent outwardly as shown at 10, which is adapted to come in contact with the fence wire or rail.

Secured to the inner surface of the metallic band 1 and extending entirely around its elliptical shaped portion is a strip of leather 11 or other pliable material which is secured to the said metallic band by rivets 12, properly spaced and arranged to hold the lining 11 in its proper position.

Passing around the metallic band 1 is the lower looped end 13 of a strap 14, the free end of which carries a buckle 15 and likewise secured to the opposite side of the metallic band is a similar strap 16 having suitable openings formed in its terminal free end for the usual adjustable engagement with the buckle 15 carried by the strap 14, whereby the halter and parts carried thereby may be removably secured to the animal's head when the said straps are properly connected and passed over the head of the animal. In order to more properly secure the straps 14 and 16 to the metallic band 1 and hold them in their respective positions for buckling engagement with one another, branch looped straps 17 are passed around the metallic band and have their free ends riveted or otherwise secured to the straps at a suitable distance above the looped portions thereof.

The rivets 12 are properly positioned to cause the same to be located between the looped ends of the straps 14 and 16 and also between the similar ends of the straps 17, whereby said looped ends are yieldingly but securely held in their proper position in respect to the metallic band for properly supporting the latter, the leather strip 11 forming the lining for the band passing over the looped ends of the straps and projecting therefrom a sufficient distance to form contacting cushions 18 which come in direct contact with the head of the animal.

Secured to the front face of the plate 9 is a staple 19 which is located immediately below the outwardly projecting end of said plate, through which staple a strap 20 is loosely passed, one end of which is provided with a buckle 21 and having its opposite ends perforated for engagement with said buckle, whereby said strap may be adjusted about the upper portion of the head of the animal in rear of the horns of the same, the said strap 20 being secured to the straps 14 and 16 adjacent to the ends thereof by rivets 23, whereby the nose plate 9 is properly held in its position in respect to the face of the animal. Also loosely carried by the bolt 4 between the extensions 3 of the metallic band 1 is a ring 24 to which is secured one end of a rope 25 for leading or tying the animal in the usual manner.

The device herein shown and described may be readily attached to the head of the animal when the ends of the straps are disconnected in the usual manner with the mouth of the animal projecting a sufficient distance below the metallic band 1 and while in this position the ends of the several straps are buckled over the head and behind the horns of said animal, in which position the hooked arm 6 will assume a perpendicular position.

As before stated the metallic band 1 is resilient and in its normal position will be in yielding contact with the lower portion of the head of the animal, the bolt 4 permitting the band to expand a sufficient distance to accommodate itself to different shapes and sizes and contour of the animal's head above its mouth.

From the foregoing description it will be readily seen that should the animal make an attempt to escape through a fence or other inclosure, the hooked arm 6 will engage with one of the wires or rails of the fence by the upward movement of the head and by a downward movement of the head of the animal the outwardly projecting extension 10 of the face plate 9 will come in contact with one of the wires or rails of the fence above the animal's head, whereby it is impossible for the animal to force its head through and between the wires or rails of the fence.

In carrying out the invention the rivets 23 are preferably dispensed with leaving the straps 14 and 16 free to be adjusted independently of the band 20, whereby the uniting ends of said straps may be properly adjusted and fastened in a desirable position about the head of the animal adjacent to the horns of the same.

What is claimed is:

1. A device of the character described comprising a halter adapted to be secured about the animal's head, a resilient band forming a part of said halter, the terminal ends of said band being bent outwardly and separated therefrom and provided with suitable openings, a bolt passing through said openings for limiting the expanding position of the band, a face plate secured to the forward portion of the band and having its upper end bent outwardly, and a hooked arm loosely depending from said halter, as and for the purpose described.

2. A device of the character described comprising an elliptical shaped resilient band adapted to encircle the head of an animal, the terminal ends of said band being bent outwardly and separated therefrom and provided with suitable openings, a bolt passing through said openings for limiting the expanding position of the band, pliable material secured to the inner surface of said band, straps having looped ends passing around the said band, a portion of which is covered by the pliable lining forming suitable cushions around the band about the looped portions of the straps, and means depending from said bolt for engagement with the wire or rail of a fence as and for the purpose described.

In testimony whereof we affix our signatures, in presence of two witnesses.

JOSEPH J. STEELE.
DELONA D. OWENS.

Witnesses:
SID. G. CASTLES,
HARVEY WARREN.